United States Patent
Alcove Clave et al.

(10) Patent No.: US 10,882,031 B2
(45) Date of Patent: Jan. 5, 2021

(54) CATALYST FOR TREATING AN EXHAUST GAS, AN EXHAUST SYSTEM AND A METHOD

(71) Applicant: JOHNSON MATTHEY PUBLIC LIMITED COMPANY, London (GB)

(72) Inventors: Silvia Alcove Clave, Reading (GB); Paul Andersen, Audubon, PA (US); Maria Brandmair, Redwitz an der Rodach (DE); Manop Huber, Royston (GB); Michael Nash, Royston (GB); David Repp, Royston (GB)

( * ) Notice: Subject to any disclaimer, the term of this patent is extended or adjusted under 35 U.S.C. 154(b) by 6 days.

(21) Appl. No.: 15/937,902

(22) Filed: Mar. 28, 2018

(65) Prior Publication Data

US 2018/0280943 A1 Oct. 4, 2018

Related U.S. Application Data

(60) Provisional application No. 62/479,378, filed on Mar. 31, 2017.

(30) Foreign Application Priority Data

Sep. 27, 2017 (GB) .................... 1715663.9

(51) Int. Cl.
| | |
|---|---|
| *B01D 53/14* | (2006.01) |
| *B01D 53/86* | (2006.01) |
| *B01D 53/94* | (2006.01) |
| *B01J 23/22* | (2006.01) |
| *B01J 23/28* | (2006.01) |
| *B01J 23/30* | (2006.01) |
| *B01J 27/199* | (2006.01) |
| *B01J 35/06* | (2006.01) |

(52) U.S. Cl.
CPC ........ *B01J 27/199* (2013.01); *B01D 53/1431* (2013.01); *B01D 53/8628* (2013.01); *B01D 53/8665* (2013.01); *B01D 53/9418* (2013.01); *B01D 2251/206* (2013.01); *B01D 2251/2062* (2013.01); *B01D 2251/2067* (2013.01); *B01D 2255/20707* (2013.01); *B01D 2255/20723* (2013.01); *B01D 2255/20769* (2013.01); *B01D 2255/20776* (2013.01); *B01D 2255/70* (2013.01); *B01D 2255/90* (2013.01); *B01D 2257/302* (2013.01); *B01D 2257/404* (2013.01); *B01D 2257/602* (2013.01); *B01D 2258/0233* (2013.01); *B01D 2258/0283* (2013.01); *B01D 2258/0291* (2013.01); *B01J 35/06* (2013.01); *B01J 2523/00* (2013.01)

(58) Field of Classification Search
CPC ... B01J 23/22; B01J 23/28; B01J 23/30; B01J 27/199; B01D 53/1431; B01D 53/8628; B01D 53/8665; B01D 53/9418
See application file for complete search history.

(56) References Cited

U.S. PATENT DOCUMENTS

| | | | | |
|---|---|---|---|---|
| 8,470,728 B2* | 6/2013 | Kato | ................... | B01D 53/8665 502/209 |
| 8,535,628 B2 | 9/2013 | Kato | | |
| 9,186,657 B2* | 11/2015 | Kato | ................... | B01D 53/8628 |
| 2009/0246111 A1* | 10/2009 | Kato | ................... | B01D 53/8665 423/239.1 |
| 2010/0183492 A1 | 7/2010 | Kato | | |
| 2010/0210455 A1 | 8/2010 | Nochi et al. | | |
| 2011/0116999 A1* | 5/2011 | Kato | ................... | B01D 53/8628 423/239.1 |
| 2011/0189069 A1* | 8/2011 | Kato | ................... | B01D 53/8665 423/239.1 |
| 2011/0250114 A1 | 10/2011 | Augustine et al. | | |
| 2013/0129590 A1* | 5/2013 | Kato | ..................... | B01J 27/199 423/239.1 |
| 2013/0190166 A1* | 7/2013 | Kato | ................... | B01D 53/8628 502/78 |

FOREIGN PATENT DOCUMENTS

JP 2013052371 3/2013

* cited by examiner

*Primary Examiner* — Cam N. Nguyen

(57) ABSTRACT

A catalyst for treating an exhaust gas comprising $SO_2$, $NO_x$ and elemental mercury in the presence of a nitrogenous reductant comprises a composition containing oxides of: (i) Molybdenum (Mo) and optionally Tungsten (W); and (ii) Vanadium (V); and (iii) Titanium (Ti); and (iv) Phosphorus (P), wherein, with respect to the total metal atoms in the composition, the composition comprises: (i) Mo in an amount of less than 2 at. %, and optionally up to 9 at. % W; (ii) from 2.5 to 12 at. % V; (iii) from 85 to 96 at. % Ti, and wherein the composition comprises (iv) P in an atomic ratio to the sum of atoms of Mo, W and V of from 1:2 to 3:2. The values expressed must total 100%.

9 Claims, No Drawings

CATALYST FOR TREATING AN EXHAUST GAS, AN EXHAUST SYSTEM AND A METHOD

The present invention relates to a catalyst for treating an exhaust gas. In particular, it relates to a catalyst which maintains a relatively high level of activity for oxidizing elemental mercury (Hg) contained in coal combustion exhaust gas and the like, as well as a relatively high level of activity for reducing nitrogen oxides contained in the gas in the presence of a nitrogenous reductant, such as ammonia, and which minimizes the oxidation of $SO_2$ contained in the gas to $SO_3$. That is the catalyst is designed selectively to oxidize elemental mercury over oxidizing $SO_2$. The present invention also relates to an exhaust gas treatment method using the catalyst, and to an exhaust system for carrying out the method.

Power plants often utilize fossil fuels as the energy source, such as coal, oil or natural gas, and combustion of these fuels generates exhaust gas that must be treated to remove nitrogen oxides ($NO_x$), including NO (nitric oxide), $NO_2$ (nitrogen dioxide), and $N_2O$ (nitrous oxide). The exhaust generated in power plants is generally oxidative, and the $NO_x$ needs to be reduced selectively with a catalyst and a reductant, which is typically ammonia or a short-chain hydrocarbon. The process, known as selective catalytic reduction (SCR), was extensively investigated in the 1970s for removing $NO_x$ from power plant exhaust gas and the like.

Coal and oil contain various amounts of sulfur. Treatment of exhaust from these plants using SCR demands maintenance of a relatively high $NO_x$ reduction efficiency while minimizing $SO_2$ oxidation. Many SCR catalysts are effective in converting $NO_x$ to nitrogen and water in the presence of ammonia. However, an undesirable side reaction, the oxidation of $SO_2$ to $SO_3$, commonly occurs along with $NO_x$ reduction. The formation of sulfur trioxide ($SO_3$), a component of acid rain, needs to be controlled.

Thus, a catalyst that maximizes the rate of $NO_x$ reduction ($kNO_x$) while minimizing the rate of $SO_2$ oxidation ($kSO_x$) is highly desirable. Therefore, in recent years, demand has arisen particularly for a $NO_x$-removal catalyst which produces a relatively low amount of $SO_2$ oxidation. In general, such a $NO_x$-removal catalyst contains a small amount of vanadium, which is an active component of the catalyst. It is known that Hg, Pb, F, and other trace components contained in flue gas discharged from power plants, factories of various types, and automobiles result in health problems. This is in addition to $NO_x$ and $SO_x$ contained in such flue gas.

It is therefore desirable to provide a catalyst which is able to selectively oxidize mercury which is discharged from a coal-fired boiler mostly in the form of elemental mercury having a relatively high vapor pressure, while reducing $NO_x$ in the exhaust gas and while minimizing the oxidation of $SO_x$. In the conventional power plant SCR catalysts, Hg oxidation activity is predominantly provided by vanadium oxide, which is an active component, and thus an activity of oxidizing elemental mercury (Hg) can be enhanced by increasing vanadium content (V content). However, since a vanadium oxide has not only a relatively high Hg oxidation activity but also $SO_2$ oxidation activity, an increase in V content promotes $SO_2$ oxidation, and the resultant $SO_3$ can contribute to smoke pollution and the formation of acid rain. The highly volatile mercury (elemental mercury, Hg) is typically oxidized by V into a mercury compound (e.g., mercury chloride). Subsequently, the thus-oxidized mercury compound is removed together with combustion ash or gypsum by means of a wet scrubber, an electric dust collector or desulfurization apparatus provided downstream of the exhaust gas treatment system. In such known systems a catalyst containing titanium oxide, and an oxide of a metal (e.g., vanadium) serves as an active component.

Accordingly, SCR catalysts for coal fired power plants are required to have relatively high SCR activity, relatively high Hg oxidation activity, and relatively low $SO_2$ oxidation activity. Literature accounts have shown that increasing vanadia and molybdena loads in plate type SCR catalysts increases Hg oxidation activity. Prior art also shows that the addition of phosphoric acid to the catalyst formulation SCR catalysts with high vanadia and molybdena loads had high SCR and Hg oxidation activity but relatively low $SO_2$ oxidation activity. U.S. Pat. No. 8,535,628 discloses a range of such plate-type catalysts. WO2015187525 also discloses such catalysts.

Thus, a conventional catalyst faces a trade-off between Hg oxidation activity on the one hand and $SO_2$ oxidation activity on the other hand and typically fails to provide both relatively high Hg oxidation activity and relatively low $SO_2$ oxidation activity. In view of the foregoing, an object of the present invention is to overcome the trade-off problem of the conventional catalyst and to provide an exhaust-gas-purifying catalyst that meets the aforementioned requirement concerning Hg oxidation activity and $SO_2$ oxidation activity; i.e., an exhaust gas purifying catalyst which specifically reduces percent $SO_2$ oxidation, while maintaining percent Hg oxidation at a relatively high level.

This invention describes a catalyst with relatively high SCR and Hg oxidation activity and minimized $SO_2$ oxidation activity but with a relatively low molybdena load. This has a cost advantage over the prior art without compromising the efficacy. Accordingly, it is an object of the invention to provide an improved catalyst, method and/or system compared to the prior art, or a more cost-effective one, or at least to provide a commercially useful alternative thereto.

According to a first aspect there is provided a catalyst for treating an exhaust gas comprising $SO_2$, $NO_x$ and elemental mercury in the presence of a nitrogenous reductant, the catalyst comprising a composition containing oxides of:
(i) Molybdenum (Mo) and optionally Tungsten (W); and
(ii) Vanadium (V); and
(iii) Titanium (Ti); and
(iv) Phosphorus (P),
wherein, with respect to the total metal atoms in the composition, the composition comprises:
(i) Mo in an amount of less than 2 at. %, and optionally up to 9 at. % W;
(ii) from 2.5 to 12 at. % V;
(iii) from 85 to 96 at. % Ti, and
wherein the composition comprises (iv) P in an atomic ratio to the sum of atoms of Mo, W and V of from 1:2 to 3:2. It will be understood that the values expressed must total 100%.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

Furthermore, the term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

JP2013-52371 discloses a SCR catalyst comprising an oxide of titanium (Ti), at least one of molybdenum (Mo) and tungsten (W), vanadium (V), and phosphorus (P), and a denitration reaction method, which is performed at the temperature equal to or lower than the precipitation temperature of acid ammonium sulfate determined by the product of the respective concentration of $NH_3$, $SO_3$ and water ($H_2O$).

TABLE 1 of JP2013-52371 discloses the following compositions:

| Name of starting materials | Example 1 | Example 2 | Example 3 | Example 4 |
|---|---|---|---|---|
| Titanium oxide (g) | 900 | 946 | 911 | 900 |
| Ammonium hexamolybdate (g) | 113 | 85 | 24 | 16 |
| Ammonium metavanadate (g) | 105 | 45 | 19 | 15 |
| Silica sol (g) | 109 | 107 | 95 | 371 |
| Phosphoric acid (g) | 53 | 56 | 21 | 26 |
| Inorganic fiber (g) | 164 | 160 | 143 | 139 |

The corresponding atomic ratios relevant to compare with the claimed invention are as follows:

| Component | Example 1 | Example 2 | Example 3 | Example 4 |
|---|---|---|---|---|
| Mo | 6.88 | 5.24 | 1.62 | 1.10 |
| V | 6.88 | 2.99 | 1.38 | 1.11 |
| Ti | 86.24 | 91.78 | 96.99 | 97.78 |
| P/(V + Mo) | 0.30 | 0.54 | 0.61 | 1.04 |

The present invention relates to a catalyst for treating an exhaust gas comprising $SO_2$, $NO_x$ and elemental mercury. These gases are included in the exhausts of certain combustion systems and, in particular, those from the boilers of coal or oil power plants.

The catalyst works to treat the exhaust gas in the presence of a nitrogenous reductant. Preferably the nitrogenous reducing agent is ammonia, hydrazine or an ammonia precursor selected from the group consisting of urea (($NH_2$)$_2CO$), ammonium carbonate, ammonium carbamate, ammonium hydrogen carbonate and ammonium formate, or a mixture of two or more thereof. Systems for metering these agents into exhaust gas flows are well known in the art.

The catalyst comprises a composition. The composition contains oxides of Molybdenum (Mo) and optionally Tungsten (W). The Mo is present in the composition in an amount of less than 2 at. % with respect to the total metal atoms in the composition. Preferably the composition comprises from 0.5 to 1.95 at. % Mo, more preferably 1.75 to 1.95 at. % Mo. Surprisingly, these amounts of Mo provide suitable activity without incurring undue costs due to the high cost of Mo. The inventors have also found that Mo causes difficulty when trying to extrude a composition and it is therefore preferable to use the Mo-containing formulation for providing catalytic plates.

W is optionally present in the composition in an amount up to 9 at. % with respect to the total metal atoms in the composition, preferably from 0.1 to 5 at. %. More preferably the composition does not comprise any W.

The composition of the catalyst comprises vanadium (V) oxide. The term vanadium oxide, or $VO_x$, means an oxide of vanadium, preferably with vanadium in the +5 oxidation state dispersed on a mixed oxide support. The principle oxides of vanadium are: Vanadium(II) oxide (vanadium monoxide), VO; Vanadium(III) oxide (vanadium sesquioxide or trioxide), $V_2O_3$; Vanadium(IV) oxide (vanadium dioxide), $VO_2$; and Vanadium(V) oxide (vanadium pentoxide), $V_2O_5$. As discussed above, the V is present to act as an oxidation catalyst. The V is present in the composition in an amount of from 2.5 to 12 at. % with respect to the total metal atoms in the composition. Preferably the composition comprises from 3 to 11 at. % V.

The composition of the catalyst comprises Titanium (Ti) oxide. The Ti is present in the composition in an amount of from 85 to 96 at. % with respect to the total metal atoms in the composition. Preferably the composition comprises from 85 to 95 at. % Ti. The Ti oxides provide a catalytic base material for the catalytic composition.

The composition of the catalyst comprises Phosphorus (P) oxides. It is believed that the combination of V and P exhibits (a) relatively low $SO_2$ oxidation activity, (b) moderate $NO_x$-removal activity, and (c) relatively high percent Hg oxidation. In effect, the P acts as a poison for the Vanadium with respect to $SO_2$ oxidation. The V content can therefore be increased to several times that of a conventional catalyst to achieve a level of Hg oxidation relatively higher than that in the case of the conventional catalyst whilst minimizing $SO_2$ oxidation. The P is present in an atomic ratio to the sum of atoms of Mo, W and V of from 1:2 to 3:2. Preferably the composition comprises P in an atomic ratio to the sum of atoms of Mo, W and V of from 9:10 to 7:5. These ratios ensure that there is an appropriate amount of P atoms to selectively poison the metal atoms, such as V, which could otherwise cause significant $SO_x$ oxidation.

Preferably the composition consists of oxides of Mo, V, Ti and P, and optionally W, and most preferably only oxides of Mo, V, Ti and P. That is, preferably all of the catalytically active metal ingredients are only those listed above. In some embodiments the catalyst may further comprise certain binders and/or fibers as discussed below in combination with the catalyst. Preferably the catalyst is only the composition as described herein.

The catalyst is preferably provided on a substrate or as an extruded honeycomb structure to thereby form its own substrate. The term "substrate" means a solid material on which a film can be placed.

The substrate can be in the form of a monolith, plate, or sheet, preferably a plate or sheet. The substrate can be composed of a metal, preferably a steel, more preferably a stainless steel or a FeCr-alloy. The substrate is preferably fabricated from stainless steel and preferably has a relatively high geometric surface area. It may take the form of mesh, sheet, plate, monolith, honeycomb, or the like. Preferred substrates are perforated, as in stainless-steel mesh. Preferably, the substrate is capable of fluting, stacking, and/or arranging into stackable units or groups. The substrate is preferably calcined prior to being coated. For example, stainless-steel mesh is preferably heated in an oven, on a hotplate, or otherwise to 500° C. to 1000° C., preferably 600° C. to 900° C., prior to coating. The substrate may also be abrasively treated, such as by grit, or sand, blasting.

Preferably the catalyst is a plate catalyst. Preferably the plate comprises the catalyst in an amount of from 0.4 to 2 kg/m$^2$ and more preferably from 0.5 to 1.0 kg/m$^2$. Plate catalysts are well known in the art and typically contain an expanded metal sheet or perforated metal sheet onto which a catalyst composition mass is pressed and/or infiltrated and then calcined. Such a known process is described, for example, in U.S. Pat. No. 6,054,408.

When applying a catalyst composition to a substrate such as a plate, a paste may be used. Water is added to a chemically stabilized titanium dioxide of the anatase type to form a kneadable mass or composition, to which water-soluble compounds of molybdenum and vanadium, such as ammonium heptamolybdate and ammonium metavanadate, for example, are then added in accordance with intended concentrations, to form a mass. This mass is kneaded. After the desired water content of the mass has been set, inorganic minerals, such as clays and/or fiber materials such as glass fibers, for example, are added to the mass in a process to increase its mechanical strength. During this step, other additives, such as film forming agents, dispersing agents, thickening agents and the like, can also be added to the kneaded mass. The resulting mass is kneaded again to form a catalyst mass. The additives, which may include glass particles, alumina, silica, silica-aluminas, ceramics, clays, inorganic oxides, minerals, polymers, or other materials, make up the balance of the solids content.

As used herein, the term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi: 10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours. The calcination is preferably done under dry conditions, but it can also be performed hydrothermally, i.e., in the presence of some moisture content.

It has been surprisingly found that the catalysts typically have enhanced activity for NO$_x$ conversion at a temperature between 300° C. and 450° C., with at the same time minimized SO$_x$ conversion activity in the same temperature window, where the NO$_x$ and SO$_x$ conversions are measured at atmospheric pressure. These are the temperatures typically encountered in a so-called high dust position within a coal power plant exhaust, for example. Lower temperature ranges are encountered in so-called tail end positions.

The catalyst composition which is infiltrated into the substrate may be provided through the use of precursor materials which form oxides when calcined.

A suitable VO$_x$ precursor is a compound that contains vanadium and the compound forms an oxide of vanadium on calcination. Examples of such compounds include, but are not limited to: vanadium oxysulfate, ammonium metavanadate, and vanadium oxytrichloride.

A suitable MoO$_x$ precursor is a compound that contains molybdenum and the compound forms an oxide of molybdenum on calcination. Examples of such compounds include, but are not limited to ammonium heptamolybdate, ammonium molybdate, molybdenum chloride, molybdenum oxalate, and molybdenum acetate.

A suitable WO$_x$ precursor is a compound that contains tungsten and the compound forms an oxide of tungsten on calcination. Examples of such compounds include, but are not limited to tungsten chloride, tungsten oxychloride, tungstic acid, ammonium metatungstate, ammonium paratungstate or premanufactured tungsten/titania.

A suitable TiO$_x$ precursor is a compound that contains titanium and the compound forms an oxide of titanium on calcination. Examples of such compounds include, but are not limited to titanium tetrachloride, titanium trichloride and titanium oxysulfate.

Raw materials employed for preparing the catalyst may be any of oxides and salts of the aforementioned catalyst components, but, in the preparation of the catalyst, a P compound must be reacted with a Mo or W compound and a V compound. Therefore, when soluble salts of the respective compounds (e.g., ammonium salts of oxoacids of the corresponding elements) are mixed together in the presence of titanium oxide and water, favorable effects are readily obtained. Specifically, preferably, water is added to titanium oxide, a soluble ammonium salt of molybdic acid and/or tungstic acid, a soluble vanadium compound, and orthophosphoric acid or an ammonium phosphate salt; the resultant mixture is kneaded to yield a paste;

and the paste is applied to a base material, followed by calcining the base material, to thereby obtain a plate-like catalyst.

When a plurality of the thus-obtained plate-like catalysts are stacked through a known method, and then subjected to molding so as to have a predetermined shape, the resultant catalyst structure may be employed as a catalyst unit which causes less clogging in the treatment of exhaust gas from a coal-fired boiler. A reinforcing agent (e.g., inorganic fiber) or a particulate binder (e.g., silica sol) may be added to the paste containing the catalyst components.

Before the paste is applied to the substrate, the substrate is treated to remove oil, either by chemical washing or by thermal treatment.

According to a further aspect there is provided a method for treating an exhaust gas comprising SO$_2$, NOx and elemental mercury, the method comprising:

contacting a flow of exhaust gas with the catalyst described herein in the presence of a nitrogenous reducing agent to thereby provide a treated exhaust gas.

According to a further aspect there is provided an exhaust system for a combustion source for performing the method described herein, the system comprising a conduit for carrying a flowing exhaust gas, a source of nitrogenous reductant, a catalyst as described herein disposed in a flow path of the exhaust gas and means for metering nitrogenous reductant into a flowing exhaust gas upstream of the catalyst.

Preferably the system further comprises a wet scrubber for recovering oxidized mercury from the treated exhaust gas.

Suitable applications include, among others, exhaust gas treatment from stationary sources such as thermal power plants, gas turbines, coal-fired power and cogeneration plants, plant and refinery heaters and boilers used in the chemical and petrochemical industries, furnaces, coke ovens, coffee roasting plants, municipal waste plants, and incinerators.

Preferably the combustion source is a boiler, such as for a coal or oil power plant. The coated articles and regenerated articles are useful for power plants, especially plants that use sulfur containing fuels such as coal, oil etc. as the energy source. Power plant SCR catalysts normally operate at temperatures in the range of 300° C. to 450° C., at atmospheric pressure, and in a high particulate environment. The sulfur content of coal varies depending upon the type of coal, e.g. bituminous coal having a sulfur content of from 0.7 to 4.0%. Typically, the exhaust gas will have a sulfur content in the range of 500 to 1500 ppm sulfur, but in some sources, the sulfur content will be 2000 to 3000 ppm or higher. Sulfur-containing fuel sources can make it challenging to control the amount of $SO_2$ that gets further oxidized to $SO_3$. Power plants rely on SCR catalysts to remove $NO_x$, but they require catalysts having the ability to do so while also minimizing the rate of $SO_2$ oxidation.

The activity of the catalyst in NOx conversion can be determined by passing a gas comprising a mixture of NO, $NH_3$, $O_2$, $H_2O$, $SO_2$ and $N_2$ over an article having the catalyst composition at 382° C. where the article is contained in a reactor; and measuring the changes in the concentrations of $NO_x$. VGB Guideline for the Testing of DENOX Catalysts, VGB-R 302 He, $2^{nd}$ revised edition (1998) describes such a procedure. The concentrations of $NO_x$ can be determined using a FTIR gas analyzer or a chemiluminescent NOx analyzer. Similarly, the activity of the catalyst in $SO_x$ conversion can be determined by passing a gas comprising a mixture of $O_2$, $H_2O$, $SO_2$ and $N_2$ over an article having the catalyst composition at 400° C. where the article is contained in a same type of reactor used for measuring $NO_x$ conversion; and measuring the changes in the concentrations of $SO_x$ by wet chemistry.

In a preferred embodiment, the catalyst is a plate catalyst comprising a composition containing oxides of Mo; V; Ti; and P; wherein, with respect to the total metal atoms in the composition, the composition comprises about 1.9 at. % Mo, about 11 at. % V; and about 87 at. % Ti, and wherein the composition comprises (iv) P in an atomic ratio to the sum of atoms of Mo, W and V of about 9:10.

In a preferred embodiment, the catalyst is a plate catalyst comprising a composition containing oxides of Mo; V; Ti; and P; wherein, with respect to the total metal atoms in the composition, the composition comprises about 1.75 at. % Mo, about 3.5 at. % V; and about 94.5 at. % Ti, and wherein the composition comprises (iv) P in an atomic ratio to the sum of atoms of Mo, W and V of about 7:5.

Preferably these catalysts are provided in an exhaust system for a coal or oil power plant for performing the method as described herein, the system comprising a conduit for carrying a flowing exhaust gas, a source of nitrogenous reductant, the catalyst disposed in a flow path of the exhaust gas and means for metering nitrogenous reductant into a flowing exhaust gas upstream of the catalyst.

EXAMPLES

The present invention will next be specifically described in detail by way of the following non-limiting examples.

The following methods were conducted to provide the examples in the table below. In table 1, the amounts are by wt. % (weight percent). In Table 2 the amounts are by at. % (atomic percent):

Preparation of Comparative Example 1 (Ref. 1.2% $V_2O_5$/TiMo)

A catalyst comprising 1.2 wt. % $V_2O_5$ and 2.7 wt. % $MoO_3$ on $TiO_2$ was prepared by combining titania with ammonium metavanadate and ammonium heptamolybdate with clay, fibers and organic binders and then kneading into a paste. The paste was laminated onto stainless-steel mesh to a thickness of 0.8 mm and calcined to form a plate-type catalyst.

Comparative Example 2—8.1% $V_2O_5$-6.4% $MoO_3$-9.4% $P_2O_5$/$TiO_2$

A catalyst comprising 8.1 wt. % $V_2O_5$, 6.4 wt. % $MoO_3$ and 9.4 wt. % $P_2O_5$ on $TiO_2$ according to U.S. Pat. No. 8,535,628 was prepared by combining titania with ammonium metavanadate, ammonium heptamolybdate and Ammoniumhydrogenphosphate with clay, fibers and organic binders and then kneading into a paste. Crystalline ammonium heptamolybdate tetrahydrate was added directly into the paste, and the mixture was further kneaded. The paste was laminated onto stainless-steel mesh to a thickness of 0.8 mm and calcined to form a plate-type catalyst.

Example 1—8.1% $V_2O_5$-2.3% $MoO_3$-6% $P_2O_5$/$TiO_2$

A catalyst comprising 8.1 wt. % $V_2O_5$, 2.3 wt. % $MoO_3$ and 6 wt. % $P_2O_5$ on $TiO_2$ was prepared by combining titania with ammonium metavanadate, ammonium heptamolybdate and ammoniumhydrogenphosphate with clay, fibers and organic binders and then kneading into a paste. Crystalline ammonium heptamolybdate tetrahydrate was added directly into the paste, and the mixture was further kneaded. The paste was laminated onto stainless-steel mesh to a thickness of 0.8 mm and calcined to form a plate-type catalyst.

Example 2—3.1% $V_2O_5$-2.3% $MoO_3$-4.9% $P_2O_5$/$TiO_2$

A catalyst comprising 3.1 wt. % $V_2O_5$, 2.3 wt. % $MoO_3$ and 4.9 wt. % $P_2O_5$ on $TiO_2$ was prepared by combining titania with ammonium metavanadate, ammonium heptamolybdate and ammoniumhydrogenphosphate with clay, fibers and organic binders and then kneading into a paste. Crystalline ammonium heptamolybdate tetrahydrate was added directly into the paste, and the mixture was further kneaded. The paste was laminated onto stainless-steel mesh to a thickness of 0.8 mm and calcined to form a plate-type catalyst.

General Procedure for Evaluating $NO_x$, $SO_x$ & Hg conversion

Each catalyst plate was first cut into strips with the dimensions of 25 mm×400 mm. Four of these strips were then mounted vertically in a reaction tube and a synthetic gas mixture was passed through the reaction tube. The synthetic gas mixture for $NO_x$, $SO_x$, and Hg testing were different for each test and the compositions and conditions of these synthetic gas mixtures are provided in the table below.

1. Hg testing:
  The compositions of inlet and outlet gases to and from the reactor were determined by on-line FTIR spectroscopy, which analyzes for multiple compounds simultaneously. The FTIR sample cell temperature was kept at about 230° C. to avoid water condensation and salt formation inside the instrument. The Hg concentrations were analyzed at both the inlet and outlet of the reactor using a commercial Continuous Emissions Monitor (CEM) that uses Cold Vapor Atomic Fluorescence Spectroscopy (CVAFS). The Hg conversion was calculated using the inlet and outlet concentrations of elemental Hg.

2. NOx testing:

The percent $NO_x$ removal was determined through measurement of $NO_x$ concentration at the inlet and outlet of a catalyst layer by means of a chemiluminescent $NO_x$ analyzer.

3. $SO_x$ testing:

Percent $SO_2$ oxidation was determined through measurement of $SO_3$ concentration at the outlet of the catalyst layer by wet chemistry.

TABLE 1

| Sample | Catalyst | kNOx (m/hr) (350° C.) | SOx conv. (%) (400° C.) | Hg conv. (%) |
|---|---|---|---|---|
| Comp. 1 | 1.2% $V_2O_5$ 2.7% $MoO_3$ Balance $TiO_2$ | 42.5 | 1.2 | 41.5 |
| Comp 2 | 8.1% $V_2O_5$ 6.4% $MoO_3$ 9.4% $P_2O_5$ Balance $TiO_2$ | 33.9 | 0.79 | 60.8 |
| Ex. 1 | 8.1% $V_2O_5$ 2.3% $MoO_3$ 6% $P_2O_5$ Balance $TiO_2$ | 34.2 | 1.3 | 70 |
| Ex. 2 | 3.1% $V_2O_5$ 2.3% $MoO_3$ 4.9% $P_2O_5$ Balance $TiO_2$ | 33.1 | 1.2 | 60.5 |

TABLE 2

| Sample | V at. % | Mo at. % | Ti at. % | P/(V + Mo + W) |
|---|---|---|---|---|
| Comp. 2 | 9.5 | 4.7 | 85.8 | 1.0 |
| Ex. 1 | 11.0 | 1.9 | 87.1 | 0.9 |
| Ex. 2 | 3.6 | 1.8 | 94.6 | 1.4 |

As is clear from test data of the catalysts, the catalyst of the present invention has good performance; i.e. it maintains good levels of $NO_x$ removal and relatively high mercury oxidation activity, and relatively low levels of $SO_2$ oxidation. Surprisingly these benefits are seen with the claimed relatively low levels of Mo and optionally relatively lower levels of $V_2O_5$, reducing the cost of producing an effective catalyst composition for treating exhaust gases as described herein.

Although preferred embodiments of the invention have been described herein in detail, it will be understood by those skilled in the art that variations may be made thereto without departing from the scope of the invention or of the appended claims.

For the avoidance of doubt, the entire contents of all documents acknowledged herein are incorporated herein by reference.

The invention claimed is:

1. A catalyst for treating an exhaust gas comprising $SO_2$, $NO_x$, and elemental mercury in the presence of a nitrogenous reductant, the catalyst comprising a composition containing oxides of:
   (i) Molybdenum (Mo);
   (ii) Vanadium (V);
   (iii) Titanium (Ti); and
   (iv) Phosphorus (P),
   wherein, with respect to the total metal atoms in the composition, the composition comprises:
   (i) from 0.5 to 1.95 at. % Mo and no Tungsten (W);
   (ii) from 2.5 to 12 at. % V;
   (iii) from 85 to 96 at. % Ti, and
   wherein the composition comprises (iv) P in an atomic ratio to the sum of atoms of Mo and V of from 1:2 to 3:2.

2. The catalyst according to claim 1, wherein the composition comprises:
   (i) from 1.75 to 1.95 at. % Mo;
   (ii) from 3 to 11 at. % V;
   (iii) from 87 to 95 at. % Ti; and
   wherein the composition comprises (iv) P in an atomic ratio to the sum of atoms of Mo and V of from 9:10 to 7:5.

3. The catalyst according to claim 1, wherein the composition consists of oxides of Mo, V, Ti and P.

4. The catalyst according to claim 1, wherein the catalyst is a plate catalyst.

5. A method for treating an exhaust gas comprising $SO_2$, NOx and elemental mercury, the method comprising:
   contacting a flow of exhaust gas with the catalyst of claim 1 in the presence of a nitrogenous reducing agent to thereby provide a treated exhaust gas.

6. The method according to claim 5, wherein the nitrogenous reducing agent is ammonia, hydrazine or an ammonia precursor selected from the group consisting of urea (($NH_2$)$_2$CO), ammonium carbonate, ammonium carbamate, ammonium hydrogen carbonate and ammonium formate, or a mixture of two or more thereof.

7. A exhaust system for a combustion source for treating an exhaust gas comprising $SO_2$, NOx and elemental mercury, the system comprising a conduit for carrying a flowing exhaust gas, a source of nitrogenous reductant, a catalyst of claim 1 disposed in a flow path of the exhaust gas, and means for metering nitrogenous reductant into a flowing exhaust gas upstream of the catalyst.

8. The exhaust system according to claim 7, the system further comprising a wet or a dry scrubber for recovering oxidized mercury from the treated exhaust gas.

9. The exhaust system of claim 7, wherein the combustion source is a furnace or a boiler, of a coal or oil power plant, a cement plant or a waste incinerator.

* * * * *